United States Patent
Pretorius et al.

(10) Patent No.: US 10,509,138 B2
(45) Date of Patent: Dec. 17, 2019

(54) SYSTEM AND METHOD FOR DISCRIMINATING BETWEEN ORIGINS OF VIBRATIONS IN AN OBJECT AND DETERMINATION OF CONTACT BETWEEN BLUNT BODIES TRAVELING IN A MEDIUM

(71) Applicant: Massachusetts Institute of Technology, Cambridge, MA (US)

(72) Inventors: Jacob Pretorius, Somerville, MA (US); Sanjay Sarma, Lexington, MA (US); Stephen Sai-Wung Ho, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 162 days.

(21) Appl. No.: 15/342,849

(22) Filed: Nov. 3, 2016

(65) Prior Publication Data
US 2017/0123086 A1    May 4, 2017

Related U.S. Application Data

(60) Provisional application No. 62/250,495, filed on Nov. 3, 2015.

(51) Int. Cl.
*G01V 1/00*    (2006.01)
(52) U.S. Cl.
CPC .................. *G01V 1/001* (2013.01)
(58) Field of Classification Search
CPC ...... G01N 29/045; G01N 29/42; G01N 29/46; G01N 29/348; G01H 1/06; G01H 1/08; G01H 1/04; G01H 1/00; G01V 1/001
See application file for complete search history.

(56) References Cited

U.S. PATENT DOCUMENTS

| | | |
|---|---|---|
| 2009/0017919 A1 | 1/2009 | Brennan |
| 2012/0006118 A1 | 1/2012 | Stothers |

(Continued)

FOREIGN PATENT DOCUMENTS

| | | | |
|---|---|---|---|
| DE | 10065314 A1 * | 7/2002 | ............ G01H 1/006 |
| WO | WO2000010333 A1 | 2/2000 | |

OTHER PUBLICATIONS

A Super-Intelligent Computer, Machine Translation of DE 100 65 314 A1, Jun. 11, 2018, esp@cenet, 1st edition, all pages.*

(Continued)

*Primary Examiner* — Leslie J Evanisko
*Assistant Examiner* — Leo T Hinze
(74) *Attorney, Agent, or Firm* — Peter A. Nieves; Sheehan Phinney Bass & Green PA

(57) ABSTRACT

A system and method for accurately detecting contact between two objects in a medium comprises at least one sensor for detecting vibration of a first of the two objects and a central processing unit (CPU) for receiving an output of the at least one sensor, wherein the CPU performs the steps: converting the output of the sensor into digital form; during a calibration phase, changing the data from time domain to frequency domain; and during the calibration phase, determining a first frequency range associated with actual contact between the two objects, and a second frequency range associated with a false positive contact between the two objects. A signal processor is provided for filtering all data except that which falls within the first frequency range so as to confirm actual contact between the objects.

10 Claims, 10 Drawing Sheets

(56) References Cited

U.S. PATENT DOCUMENTS

2015/0039250 A1     2/2015  Rank
2017/0060279 A1*    3/2017  Harrison ............... G06F 3/0416

OTHER PUBLICATIONS

International Search Report for PCT/US16/60356 dated Jan. 13, 2017.

* cited by examiner

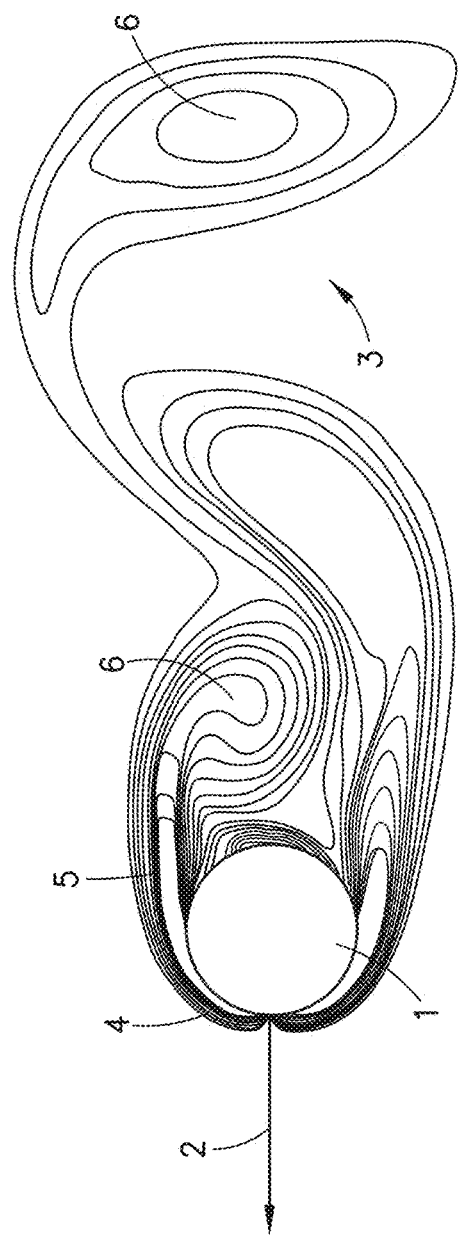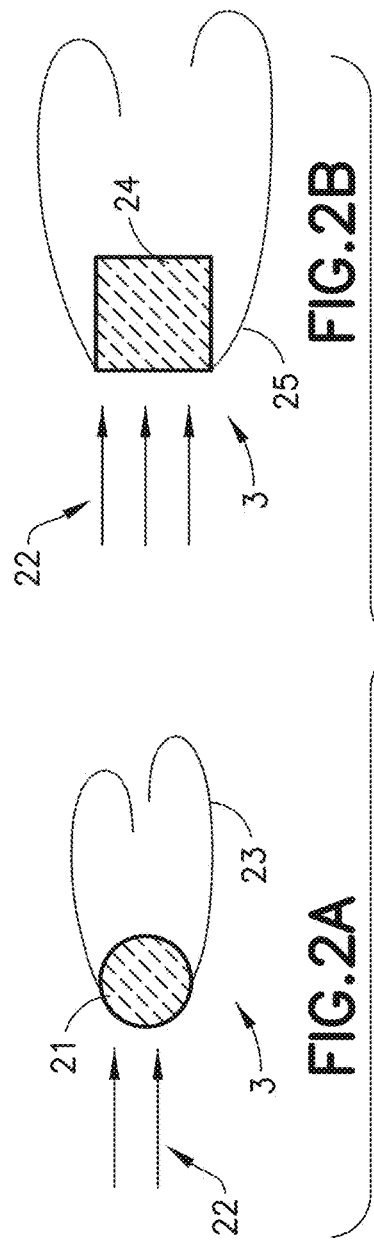
FIG. 1
PRIOR ART
FIG. 2A
PRIOR ART
FIG. 2B
PRIOR ART
FIG. 2
PRIOR ART

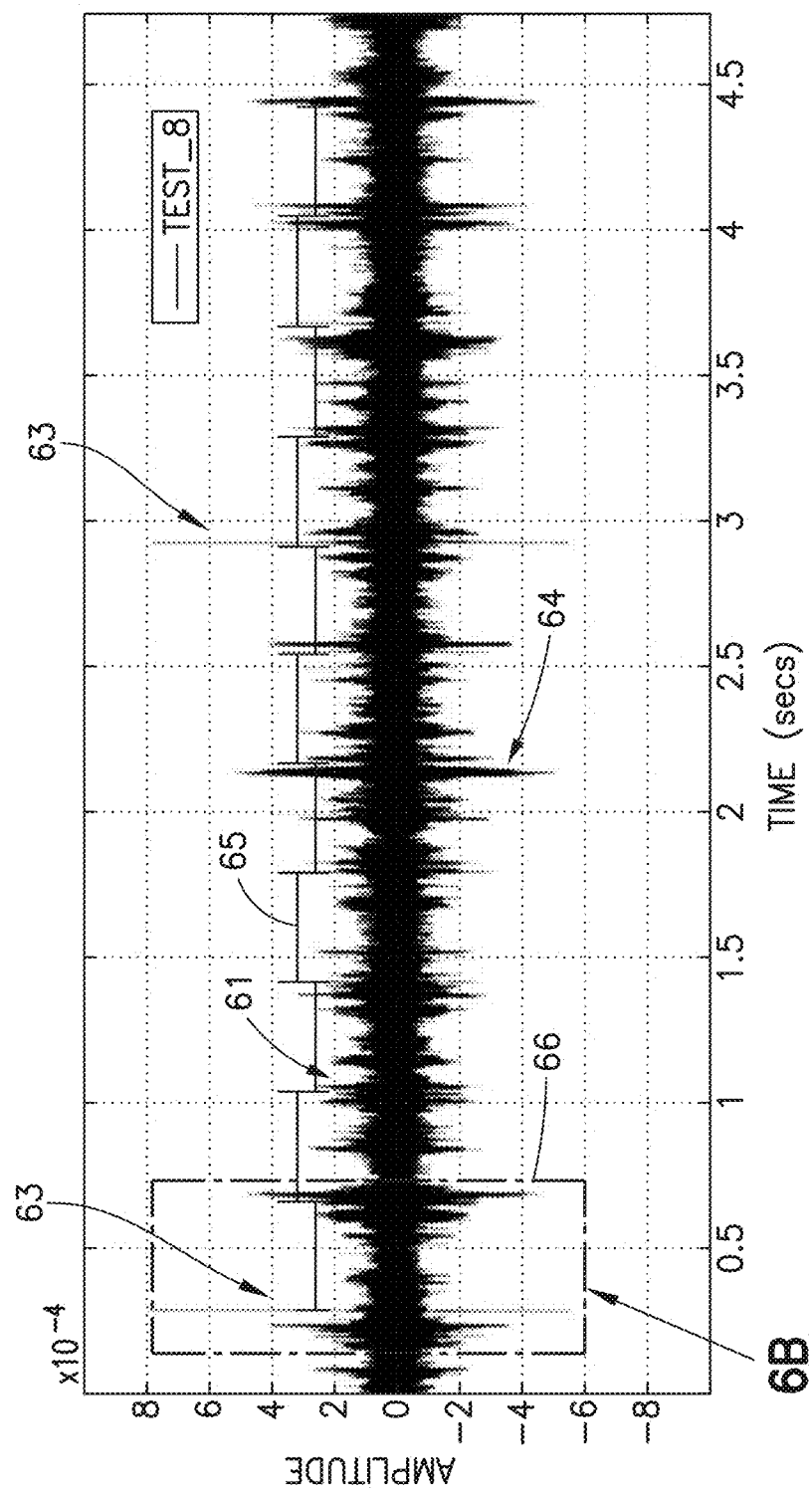

SYSTEM AND METHOD FOR DISCRIMINATING BETWEEN ORIGINS OF VIBRATIONS IN AN OBJECT AND DETERMINATION OF CONTACT BETWEEN BLUNT BODIES TRAVELING IN A MEDIUM

CROSS-REFERENCE TO RELATED APPLICATIONS

This application claims the benefit of U.S. Provisional Patent Application Ser. No. 62/250,495, filed Nov. 3, 2015, entitled "SYSTEM AND METHOD FOR DISCRIMINATING BETWEEN ORIGINS OF VIBRATIONS IN AN OBJECT AND DETERMINATION OF CONTACT BETWEEN BLUNT BODIES TRAVELING IN A MEDIUM", which is incorporated by reference herein in its entirety.

FIELD OF THE INVENTION

This invention relates to analysis of vibrations through an object or a medium the object travels through.

BACKGROUND OF THE INVENTION

There are many applications where it is desired to know if and when two objects travelling in a medium have touched or not. For instance, turbine blades spinning at high speed in a nacelle will deteriorate and possible cause fatal destruction of the engine if they come in contact with the nacelle. In the game of cricket, the bat and ball are in an air medium and contact between the two objects determines fate of a batsmen. Similarly, in the game of tennis, when the ball touches the net during a serve, the serve has to be re-taken depending on where the ball lands. Other sports in which decisions are made based on objects touching the net are badminton, table tennis and other bat sports involving a net.

To date there have been numerous methods developed to determine contact between objects. For instance, Published U.S. Patent Application No. US20090017919A1, incorporated herein by reference as useful background information, describes an infra-red based approach where friction caused by contact of objects will alter the heat signature of both objected, the friction being capable of detection by a sufficient resolution thermal camera. This method has the disadvantage of the contacted objects being required to enter and remain in the observable plane of the camera for a sufficiently long time for the image to be resolved. Furthermore, the quality of the image is dependent on the amount of friction between the two objects as well as the infrared emitting wavelength of the material. Therefore this method requires a number of very expensive cameras in order to be effective.

Published PCT Application WO2000010333A1, incorporated herein by reference as useful background information, describes a technique that utilizes sound to determine the contact between two objects. This is a widely used technique since it requires only one reasonably high quality microphone to detect the sound. However, in order to disseminate the origin of the sound, medium-speed cameras are needed to resolve the conundrum. Also, as has been showed recently, there exists a condition where this method can create a false positive.

Vibration detection mechanisms have been suggested but have not been implemented on a wide range of equipment. This method relies on sensors that detect acoustic vibrations in equipment to inform on contact between objects. This method requires alterations of the equipment being used. Often these alterations are intrusive to the equipment, require mobile power sources, and require additional signal conditioning electronics. This method is also highly susceptible to false positives when objects are close to, but not touching each other.

False positives are a phenomenon where pressure waves generated in the medium by an object travelling though the medium, interact with a second object, causing vibrations in both the object and the medium. These vibrations will be measured by the acoustic and vibration sensors in the medium and objects respectively and be reported as contact between the bodies.

SUMMARY OF THE INVENTION

This invention overcomes disadvantages of the prior art by providing a system and a method for discriminating between contact of bodies travelling in a medium and pressure waves of the medium interacting with the bodies. This system and method improves accuracy and reduces false positives in the determination of contact between objects, while reducing the cost and intrusiveness of detection equipment.

In an illustrative embodiment, a system and method for detecting contact between two objects in a medium is provided. A measuring device detects vibrations, and a signal conditioning device performs signal analysis on the vibrations. The signal conditioning device is capable of differentiating between signals generated by the interactions of the pressure waves created by objects moving in the medium and physical contact made between the objects. The measuring device can be a vibration sensor. The vibration sensor can be capable of sensing vibrations in the medium. The vibration sensor can be capable of sensing vibrations in the object. The vibration sensor can be a microphone capable of sensing sound vibrations in air. The vibration sensor can be a piezoelectric sensor capable of sensing vibrations in solid materials. The medium can be air, and the objects can be a bat and a ball.

Referring to the system, at least one sensor for detecting vibration of a first of the two objects is provided, as well as a central processing unit (CPU) for receiving an output of the at least one sensor, wherein the CPU performs the steps: converting the output of the sensor into digital form; during a calibration phase, changing the data from time domain to frequency domain; and during the calibration phase, determining a first frequency range associated with actual contact between the two objects, and a second frequency range associated with a false positive contact between the two objects. A signal processor is provided for filtering all data except that which falls within the first frequency range so as to confirm actual contact between the objects.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1 is a side view of the pressure waves created in a medium by a spherical object moving though it indicating the effect of the shape of the object on the wave form;

FIG. 2A depicts a side views of the pressure waves created in a medium by a circular shaped object moving through it indicating the effect of the shape of the object on the waveform;

FIG. 2B depicts a side view of the pressure waves created in a medium by a cube shaped object moving through it indicating the effect of the shape of the object on the waveform;

FIG. 6A is an exemplary output chart from a system of FIG. 5, showing vibration data from two objects moving relative to each other and including contact and non-contact between the two objects;

DETAILED DESCRIPTION

Figure 3:
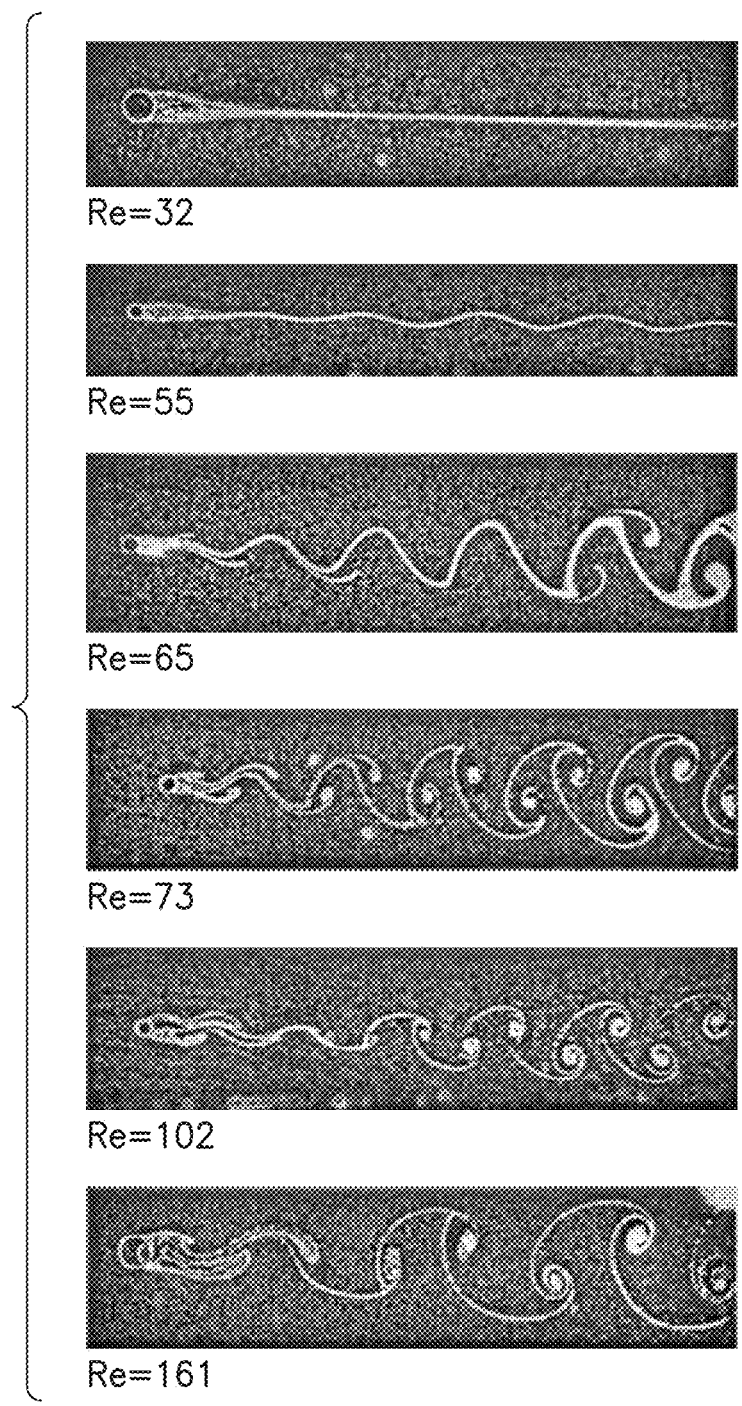
FIG. 3 is a depiction of the influence of speed and Reynolds number on the pressure wave and flow distribution around a spherical object.

When an object travels through a medium such as air, the object creates pressure waves within the medium. These pressure waves are of different types, shapes, and forms based on the geometry and speed of the object as shown in FIG. 1. Here object 1 is a sphere viewed in two dimensions. The flow lines are also shown in two dimensions per illustration, but exist all around the sphere, as is known to those of ordinary skill in the art. As object 1 moves in direction 2 through medium 3, compression waves 4 are formed in front of object 1. These compression waves force flow around body 1 creating compression and expansion waves 5 in the medium. As is known by those having ordinary skill in the art, compression waves and expansion waves are types of pressure waveforms. The net result is wake 6, which is a series of compression and expansion waves that exists in medium 3 for a while after object 1 has moved through. The intensity and duration of wake 6 is dependent on the velocity, size and orientation of object 1, as well as the physical and thermodynamic properties of medium 3.

FIG. 2 illustrates the effect that varying the shape of objects traveling through a medium has on pressure waveforms. FIG. 2A shows an exemplary pressure waveform 23 created in a medium 3 moving in direction 22 and impacting a spherical object 21. FIG. 2B shows an exemplary pressure waveform 25 created in a medium 3 moving in direction 22 and impacting rectangular object 24. It should be clear that the medium is moving relative to the object in each depiction of FIG. 2, and that either the medium, the object, or both can be in motion. Flat cross section 24 tends to have higher pressure concentrations around the edges than aerodynamic shapes such as spheres 21. As is well known to those skilled in the art, pressure waves 23 and 25 are fewer and lesser in intensity when the object passing through the medium 3 is more aerodynamic in shape. Object 24, being a rectangle, creates higher intensity pressure waves for the same speed in the same medium 3. The angle at which the pressure waves 25 leave rectangular object 24 is a clear indication of higher intensity waves. This is one of the main reasons flatter objects such a rectangular object 24 have a higher drag coefficient than aerodynamic shapes such as sphere 21, as is known to those having ordinary skill in the art.

FIG. 3 illustrates another factor that influences the pressure distribution around the object, namely velocity. Velocity influences the intensity and the form/shape of the pressure distribution, where intensity scales with the square of velocity. Velocity is directly related to Reynolds number as shown in the relationship of equation 1

$$R_e = \frac{\rho V d}{\mu} \qquad \text{Eq. 1}$$

where ρ is the density of the medium, μ the dynamic viscosity of the fluid, V the velocity of the object in the fluid and d the characteristic dimension on the object, which for a circular object is the diameter. Therefore, for a rigid object with constant diameter, traveling in a medium with similar thermodynamic properties, with both the density and the dynamic viscosity of the medium being constant, the Reynolds number will scale linearly with the velocity of the object in the medium.

As shown in FIG. 3, at a certain speed and Reynolds number the flow around the object changes from laminar to turbulent, as will be understood by those having ordinary skill in the art. The type of flow also alters the form and intensity of the pressure distribution around the object, as shown in FIG. 3.

Figure 4:
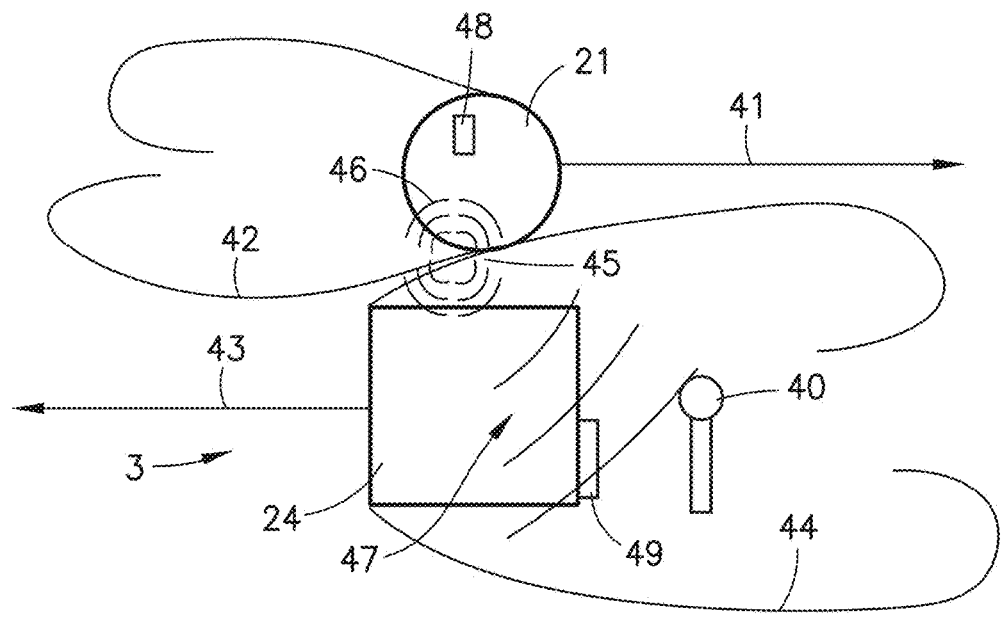
FIG. 4 is a side view of the interaction of objects and associated pressure waves travelling in the same medium.

FIG. 4 illustrates the interaction of objects travelling in the same medium. When object 21, in this example a circular object, travelling in direction 41 in medium 3 gets sufficiently close to object 24, in this example a square object, travelling in direction 43, interaction 45 between object 21 and pressure wave 44, or object 24 with pressure wave 42, or between pressure waves 42 and 44 will occur. Interaction 45 will cause a secondary pressure disturbance in medium 3, generating energy and propagating through medium 3. Propagation waves 46 and 47 will enter objects 21 and 24 and manifest itself as structural vibration waves that can be sensed by vibration sensors 48 and 49 respectively. As propagation wave 47 travels further through medium 3, it can also be sensed by appropriate vibration sensor 40 in medium 3. As an illustrative example, if medium 3 is air, propagation wave 47 will manifest itself as a sound wave and be captured by a microphone, the appropriate sensor 40 for the specific example. In this particular example, both objects 21 and 24 are moving and creating pressure waves, but, as will be known to those skilled in the art, only a single object moving in medium 3 is required to create the phenomenon. Similarly, the appropriate vibration sensor for the medium that the vibrations exits can be chosen from a plurality of available sensors as known to those skilled in the art.

Thus, even though two objects 21 and 24 will not physically come into contact with each other, they will interact with each other via the pressure waves in medium 3. This interaction will be registered by at least one vibration sensor in the first object, at least one vibration sensor in the second object as well as at least one vibration sensor in the medium 3.

To date, sensing systems designed to detect contact between objects moving though a medium, have relied solely on the presence of vibration in either object or the medium to confirm contact. However, as shown in FIG. 4, due to the interaction of the pressure waves created by moving objects in a medium, these vibrations might exist without the objects coming into physical contact. Thus, current vibration based sensing systems tasked with determining contact between objects, falsely report the existence of contact due to pressure wave interactions in the medium.

These false positives generated by sensing systems lead to errors in control and decision making systems. The present system and method provided detects and eliminates these false positives so that sensor systems can report only when actual contact between objects have actually occurred.

In order to eliminate false positives the invention described here implements a system comprising a sensor and a means of filtering and differentiating the sensor signal. Furthermore, the system is capable of recoding an actual contact event in the medium. Optionally, the system and method also has the ability to record a false positive event where no-contact has been made, but a disturbance/pressure wave is generated in the medium. Specifically, the present system and method has a calibration phase for determining characteristics of actual contact events and false positive contact events. After calibration, the returned characteristics may be saved and used when the present system and method is used for determination of actual contact in an environment requiring an accurate accounting of whether there is actual contact between objects, without the threat of false positives.

Figure 5:
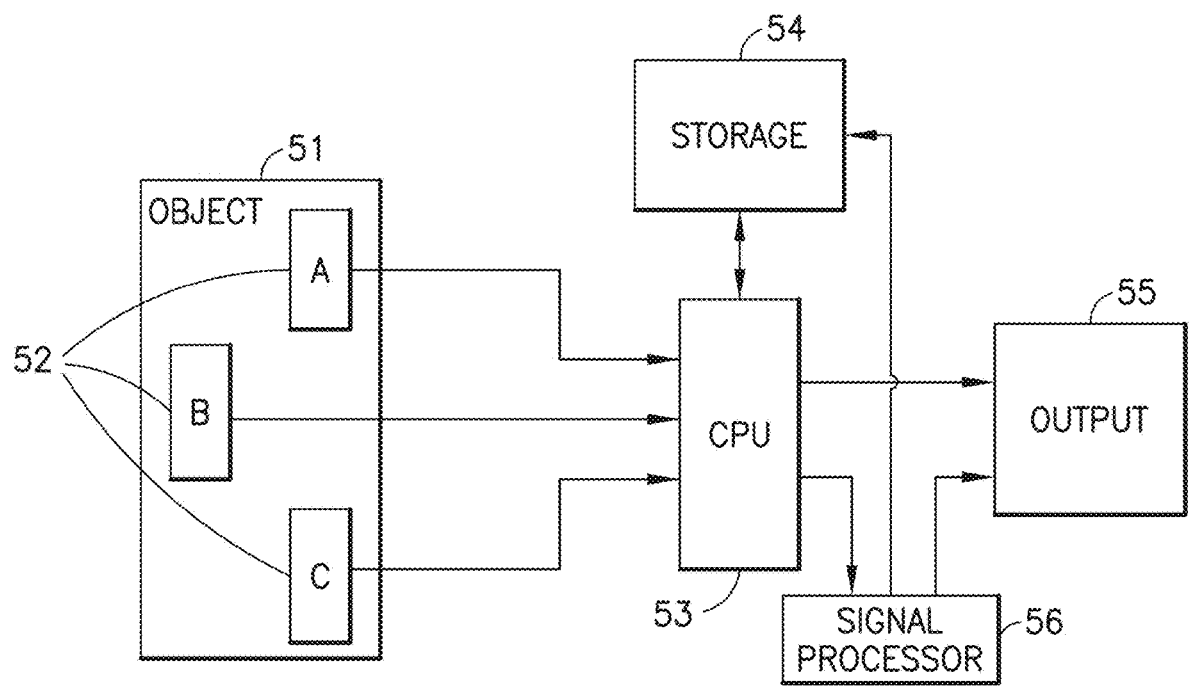
FIG. 5 is a schematic diagram of a system capable for detecting and processing vibration.

An illustrative embodiment of the system of the present invention is shown in the schematic diagram of FIG. 5. This system may be used for both calibration and actual use of the present invention. As illustrated by FIG. 5, a plurality of vibration sensors 52 are integrated into or attached to a first object 51. The vibration sensors 52A, 52B, 52C can be piezoelectric ceramics or polymers, accelerometers, electro active polymers, or any other sensor capable of generating a signal in response to being exposed to vibrations in a medium as will be known to those having ordinary skill in the art. Signals from the vibration sensors 52 are sent to a central processing unit (CPU) 53 via wireless, Bluetooth, physical cable or any other means known to those having ordinary skill in the art for communication of data. The CPU 53 has the ability to perform calculations on sensor 52 signals via signal processor 56 as well as selecting specific data and sending data for recording in a storage device 54. This data is optionally processed by signal processor 56. It should be noted that the signal processor may either be located within the CPU or separate from the CPU. In addition, as opposed to a CPU, the present invention may instead use a computer having a memory and a processor for performing processes described herein as being performed by the CPU.

The CPU 53 also has the ability to communicate results it has computed to an output 55 via a physical cable, Bluetooth, wireless, infrared or any other means apparent to those of ordinary skill in the art. The output 55 can be any means utilized to communicate results, including, but not limited to, video systems, audio systems, computer systems, handheld devices, code and any other means known to those having ordinary skill in the art.

A typical output from a structural vibration sensor is shown in the graph of FIG. 6A. This exemplary data trace was obtained with equipment that repeatedly runs one object past another object in air. This was achieved by having one object mounted to a rotating arm and the other object fixed. The apparatus use allows for the rotating object to be precisely moved toward the stationary object while it is spinning. The data trace of FIG. 6A shows examples of points where there was intermittent contact between the objects allowing for the identification of differences in the data traces of contact and non-contact. Data 61 is a trace captured from a vibration sensor 51 (FIG. 5), converted into digital form by the CPU 53 and saved in the storage device 54.

For exemplary purposes, the data trace 61 may be retrieved from the storage device 53 and plotted in FIG. 6 as data trace 61. The rotating arm period 65 is shown on top of the signal to indicate the specific time when the rotating object passes the stationary object. These were synchronized with confirmed contacts 63.

Contact between the objects 63 manifests itself as a distinctive spike in the data trace 61 with false-positive 64 manifesting as a wider trace. It is useful to note the period of false positives 64 align with the rotating period of the machine, indicating that although no contact has been made between the objects, vibration is still induced in the stationary object.

Figure 6B:
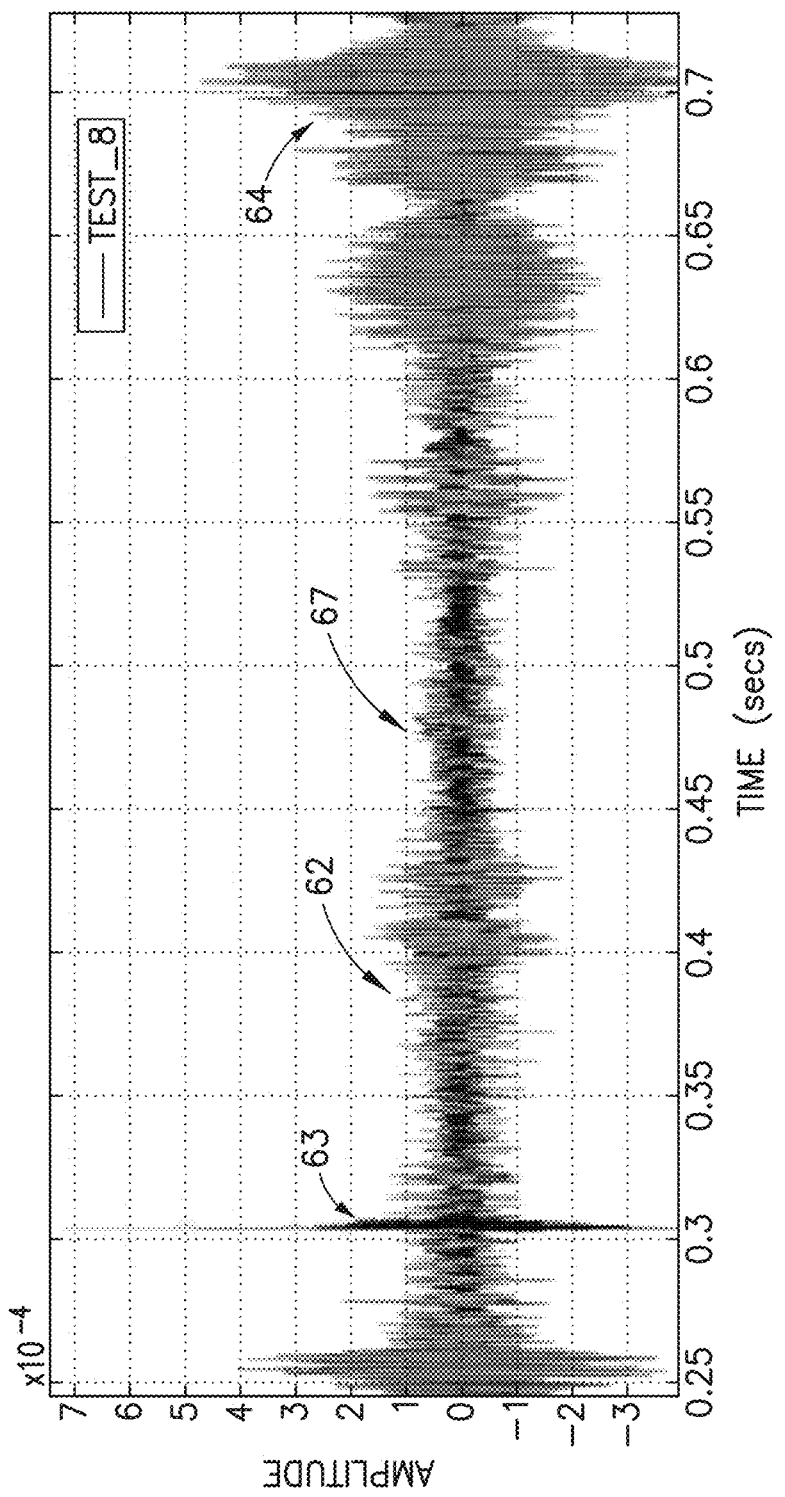
FIG. 6B is a more detailed output chart of a region of the chart of FIG. 6A.

FIG. 6B is an expanded view of box 66, indicating distinct differences in trace 61 when contact 63 is made, when false-positive 64 is generated and during the period when the objects are removed from each other and high frequency low-amplitude 67 and high frequency high-amplitude 63 events are present. It is clear that contact 63 has a number of distinctive features over the rest of the data trace 61. Firstly, the amplitude of the data trace 61 during contact 63 is higher than any other event, secondly the frequency of the vibrations in the object is much higher right after contact and thirdly the duration of the event of contact and immediate vibratory response is a lot shorter. Although the amplitude of contact 63 is not guaranteed to always be higher than false-positive 64 due to lower intensity contacts, the amplitude of contact 63 is always higher than any event when the objects are removed from each other.

Figure 7:
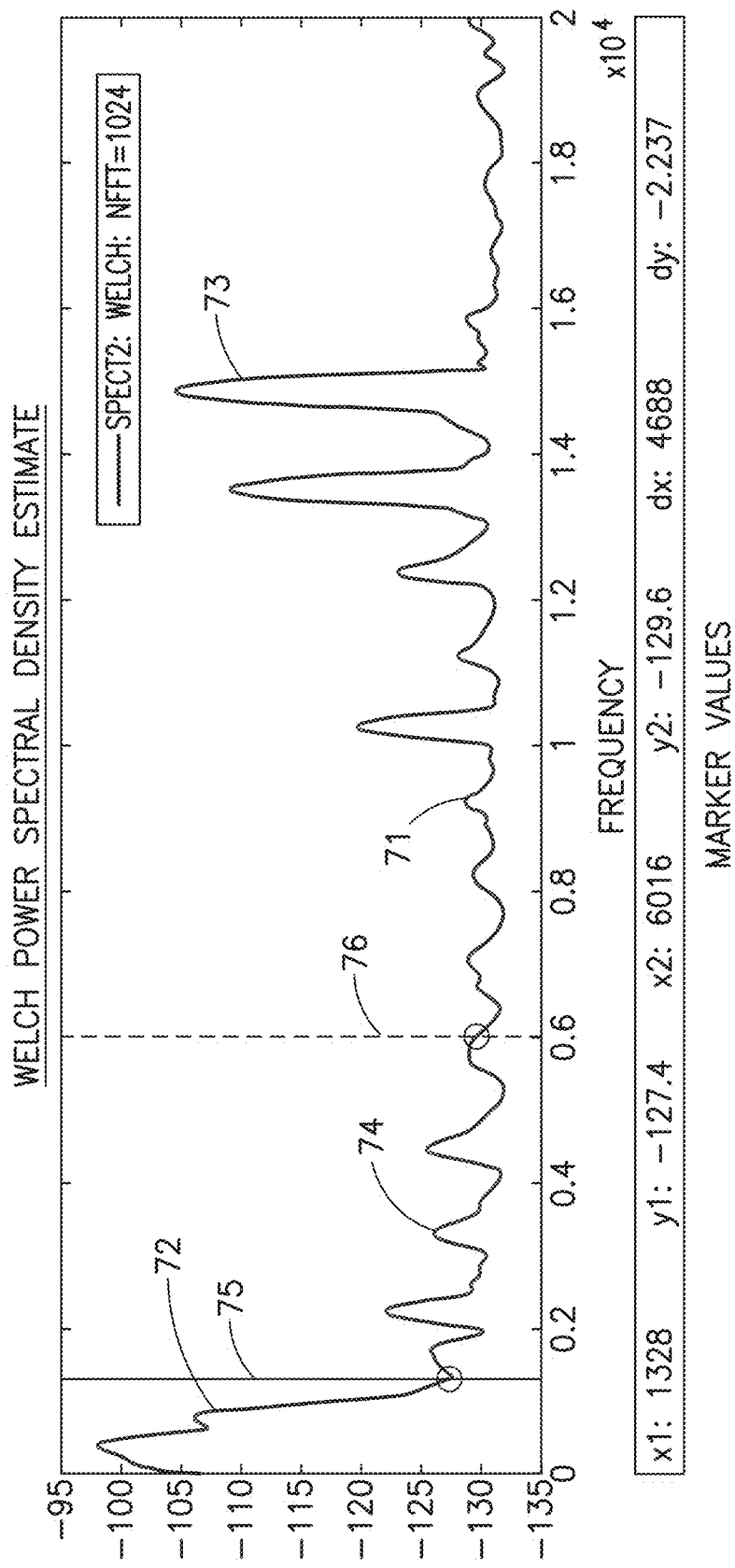
FIG. 7 is an exemplary Fast Fourier Transform of the signals depicted in FIG. 6, translating the signals from the time domain to the frequency domain.

It is clear that there are two types of signals that might represent a possible contact to a viewer, namely, a higher frequency signal and lower frequency signal. Fast Fourier Transforms (FFT) is a method well known to those having ordinary skill in the art used to translate signals from the time domain to the frequency domain. An FFT 71 of the trace 61 of FIG. 6A is shown in FIG. 7 indicating the intensity or density of a specific frequency in a particular signal. It is clear that there are a number of dominant lower 72 and higher 73 frequency events. It is also noted that use of FFT is only used for calibration. Instead, during use of the present system and method outside of calibration, the system is used on the time domain of a data trace, while searching for characteristics of actual contact so as to detect actual contact without receiving a false positive.

During testing accuracy of the present system and method, from FIG. 6, it was determined by counting the number of oscillations in a discrete time period, that the frequency of contact 74 (FIG. 7) is in the range of 2.5 kHz to 4.5 kHz depending on the intensity of the contact. By frequency analysis, it was also determined that a frequency around 1 kHz signals represent the vibrations generated in the object by the pressure waves interacting between the bodies without contact.

Thus, a filter system that can filter the higher frequency 73, larger than 6 kHz (76) as well as the lower frequency 72, lower than 1.5 kHz (75), but retain the frequency of contact 74 would be successful in distinguishing between contact and non-contact. Such systems are ubiquitous and should be known to those that have ordinary skilled in the art.

Figure 8:
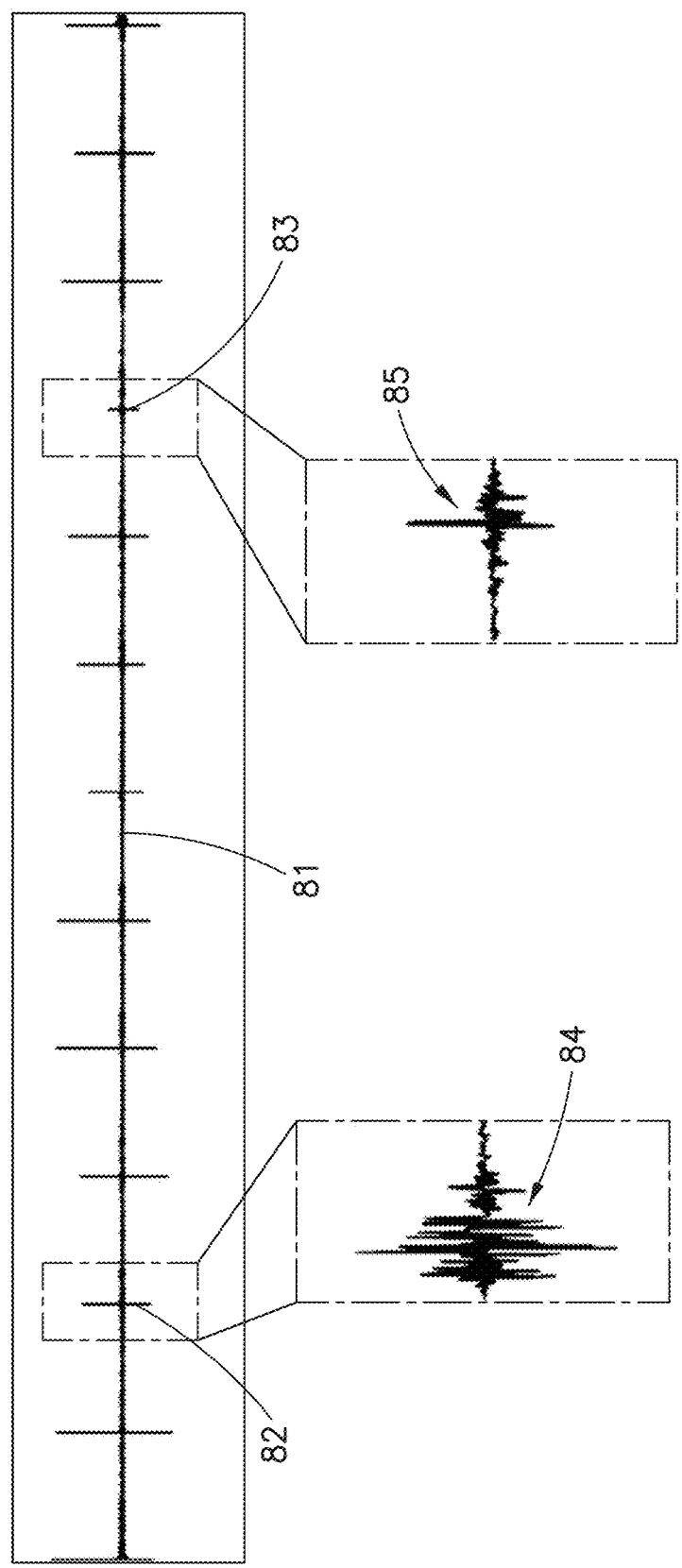
FIG. 8 is an exemplary chart showing sound waves measured by a microphone depicting vibration data from two objects moving relative to each other and including contact and non-contact between the two objects.

As an alternative embodiment the sensor is measuring vibrations in the medium as shown in FIG. 5. Here a microphone capable of measuring sound waves in air (the medium in this example) is coupled to a data recording device. The recording for the exact same experiment shown in FIG. 6, but recorded with a microphone, is shown in FIG. 8. Signal 81 indicates that the microphone confirms contact is made with every revolution of the apparatus. This is in error and upon closer investigation of the signal, it can be shown that there are some distinct features in the audio signal that can differentiate between contact 82 and non-contact 83. Contact signal 84 consists of a long duration high frequency event with a distinctive tail after the main event. Non-contact or false positive signal 85 consists of a single high frequency event followed by a low frequency tail. However, non-contact 85 signal and tail is both of lesser amplitude and shorter duration. These differences in signal make it possible, utilizing techniques known to those skilled in the art, to distinguish between contact an non-contact in measurements made in the medium.

The invention described here takes advantage of the above mentioned distinctions in vibration waves in the medium or object(s) between contact and near-miss in order to distinguish between the two events. In one illustrative example of the invention, it is possible to generate the two distinct events of contact and non-contact and record the vibrations captured by the sensing system as was shown in FIG. 6. These traces are then transformed by an FFT and the differences in fundamental frequencies recorded as shown in FIG. 7.

Figure 10:
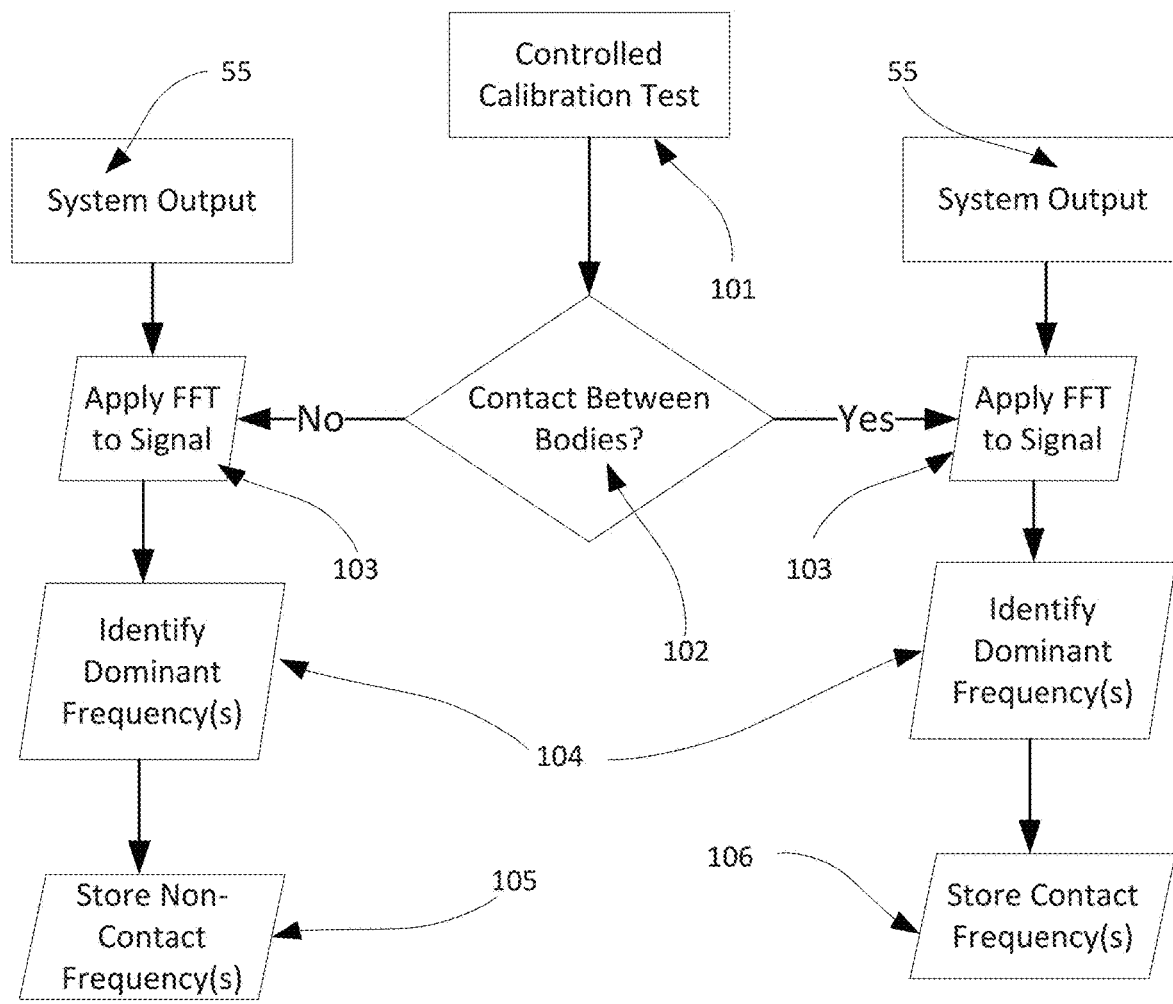
FIG. 10 is a flow chart illustrating an automated process for determining object contact and non-contact frequencies.

An illustrative example of an automated process for determining the contact and non-contact frequencies is illustrated by the flow chart of FIG. 10. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Referring to FIG. 10, here controlled calibration test 101 is able to consistently create contact between bodies and also consistently able to create non-contact events that can be interpreted as contacts by current state of the art systems. Controlled calibration test has the ability to determine whether contact is made between bodies or not by virtue of its setup. For calibration, external FFT 103 is applied to system output 55 whether contact is made or not. The process is then able to automatically identify 104 the dominant frequency or frequencies by picking the highest value or values from the FFT. These dominant frequency or frequencies are then stored for the non-contact case 105 and for the contact case 106. These values can be uploaded to the signal processor 56 and CPU 53 in order to set values for the lower frequency cutoff 75 and higher frequency cutoff 76 illustrated in the FIG. 9 and FIG. 7.

Figure 9A:
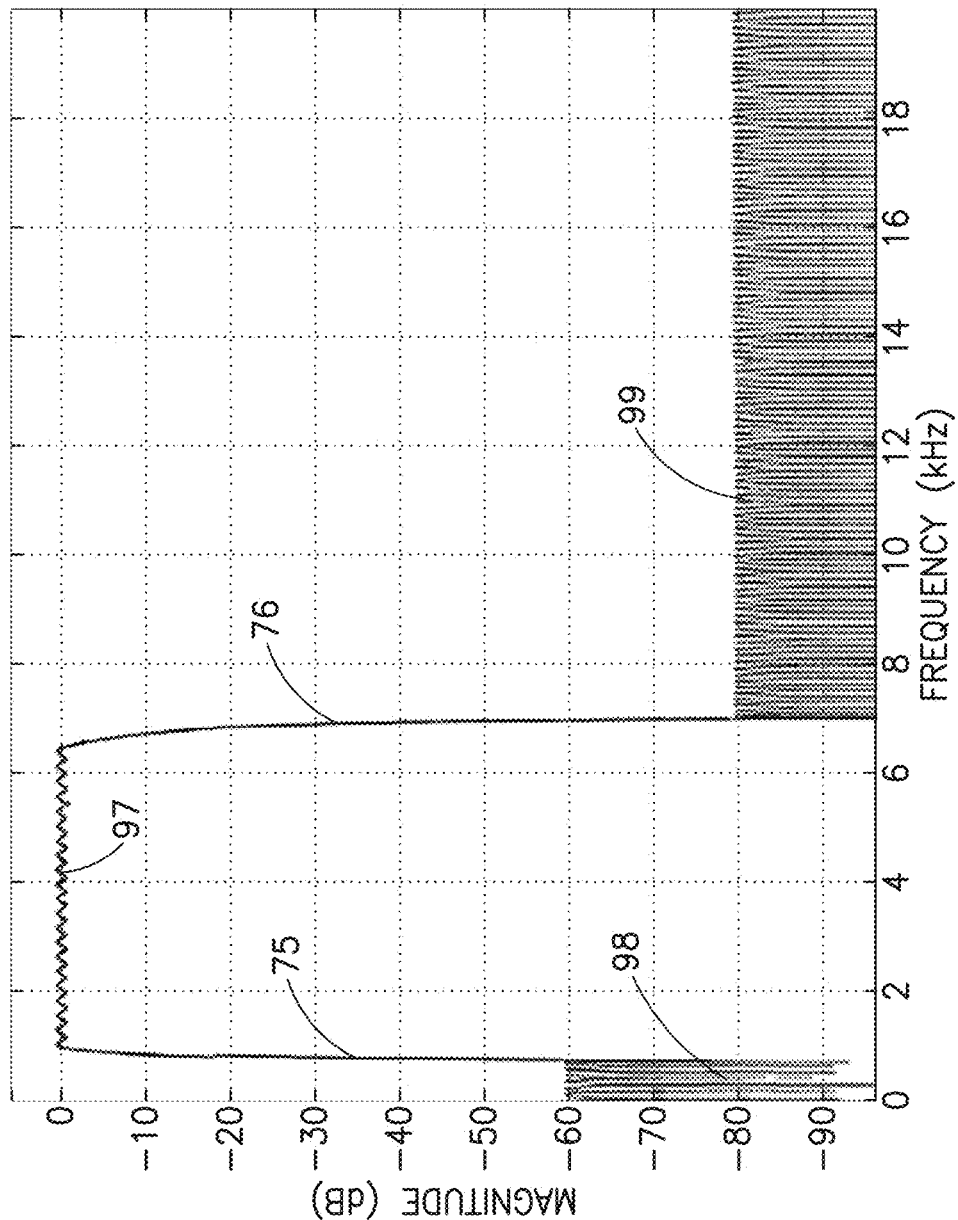
FIG. 9A is an exemplary chart showing the signal depicted in FIG. 6 after application of a bandpass filter, thereby containing only information regarding a positive contact event.

To run the present system and method in an actual environment that is not calibration, by way of example, a bandpass filter, which is well known to those having ordinary skill in the art, is created to allow only the frequency of interest through and filter all other disturbances picked up by the sensing system. As an example of applying a bandpass filter to the signal of FIG. 6, the bandpass filter can be set to filter all frequencies except in the band between 1.5 kHz (75) and 6 kHz (76) as is shown in FIG. 9A. The bandpass filter of FIG. 9A applies a 0 dB magnitude filter to all frequencies in the band of 97 that is between lower frequency cutoff 75 and higher frequency cutoff 76. The bandpass filter of FIG. 9A applies a −60 dB to −90 dB filter to lower frequencies 98. Furthermore, the bandpass filter of FIG. 9A applies more than −80 dB of filtering to all higher frequencies 79.

Figure 9B:
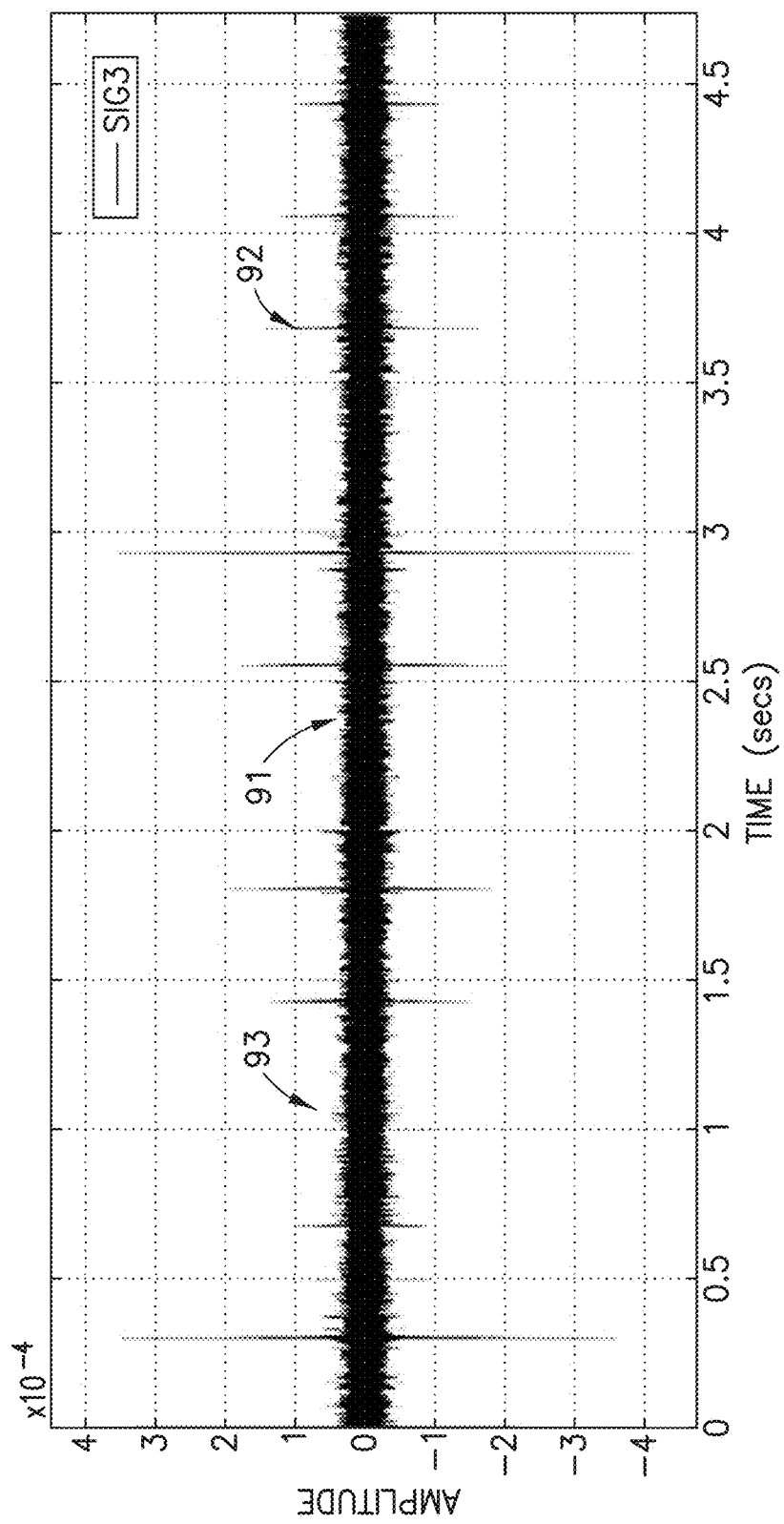
FIG. 9B is a more detailed output chart of a region of the chart of FIG. 9A.

Once the bandpass filter of FIG. 9A has been applied to signal 61, the remainder will only contain information regarding a positive touch event. This is illustrated in FIG. 9B where filtered signal 91 was created from signal 61 of FIG. 6 by applying the bandpass filter of FIG. 9A, set to pass through only frequencies of 1 kHz to 6 kHz. It is clear that only contact event 92 is visible in trace and that non-contact event 93 has completely disappeared from trace 91, rendering the trace a viable tool to differentiate between contact and non-contact of the bodies in the medium. This system will enable the detection of the interaction event of the two bodies in the medium whether the vibrations in either body or in the medium is monitored by a simple amplitude detection system that is well known to those skilled in the art.

If there is not sufficient distinction in the frequencies at which an actual contact between the bodies occur and when a false positive is registered, additional advanced signal analysis can be applied in order to differentiate between the two events. Spectral energy density calculations can be performed to identify the amount of energy in every frequency. Similar to FFT, spectral energy density calculations provide the amount of power or amplitude contributed to the signal by a frequency, per unit frequency. Alternatively, the total energy of the signal can be calculated and divided by the peak amplitude. There are many more ways for signals of different frequency and energy components to be differentiated and identified that will be well known to those having ordinary skill in the art.

The above description illustrates how the origin of vibration signals in a medium can be differentiated by means of signal-processing of these recorded vibration traces. Furthermore, a specific distinction between contact and non-contact between objects in a medium can be determined based on the properties of the vibration signals in the individual objects or in the medium. This differentiation can be performed by a multitude of signal processing tools available to those ordinarily skilled in the art that are able to differentiate between signals with a different magnitude of frequency.

Having detected an actual contact, it should be noted that one or more of many different output notifications may be provided to notify a user or viewer of contact between the objects. Examples of such notifications may be visual, via for example, a light, or providing an audio notification. Of course, hardware for providing such notifications, such as speakers and/or lights, would be necessary for the output notification.

The invention described here comprises a system that can record a vibration, analyze and/or manipulate the signal, and distinguish between actual contact of objects and near-miss events. It should be clear that the above-described system and method for discriminating between origins of vibrations in an object and determination of contact between blunt bodies traveling in a medium provides a highly versatile and unique solution to discriminating between origins of vibrations in an object and determination of contract between blunt bodies. This system and method is applicable to a wide range of objects and mediums, and useful in a wide range of applications, including but not limited to contact between a propeller and an object, and contact between a ball and a net, a bat, a player, or other objects.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the system and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software.

Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Additionally, different methods and/or tools for analyzing vibration will be obvious to a person skilled in the art. It is specifically contemplated that more than one method and/or tool for analyzing vibration may be employed simultaneously.

We claim:

1. A system for accurately detecting contact between two objects in a medium comprising:

a first sensor for detecting vibration in a first of the two objects;

a central processing unit (CPU) for receiving an output of the first sensor, and a storage device, wherein the CPU performs the steps of:

executing a calibration subsystem configured to perform a calibration phase comprising the steps of:

converting the output of the first sensor into digital data;

changing the digital data from time domain to frequency domain; and with the first sensor:

sensing a first instance comprising a contact event between the two objects; and sensing a second instance comprising a non-contact event between the two objects, automatically determining from the first instance a first frequency range associated with the first instance, and automatically determining from the second instance a second frequency range associated with the second instance; and a signal processor configured to implement a first bandpass filter to produce a first filtered sensor output by filtering the output of the first sensor to remove all data from the output of the first sensor except that which falls within the first frequency range, wherein the CPU is further configured to store the first frequency range and the second frequency range in the storage device, and sensing the second instance further comprises sensing a pressure wave generated in the medium by the two objects interacting.

2. The system of claim 1 where the first sensor comprises a vibration sensor attached to the first object.

3. The system of claim 2, wherein the first sensor is a piezo electric sensor capable of sensing vibrations in solid materials.

4. The system of claim 1, wherein output of the first sensor is wirelessly communicated to the CPU.

5. The system of claim 1, wherein the signal processor performs the additional step of implementing a second bandpass filter for filtering all data except that which falls within the second frequency range.

6. The system of claim 1, wherein changing the data from time domain to frequency domain is performed by obtaining a Fast Fourier transform of the digital data.

7. The system of claim 1, further comprising an amplitude detection system configured to monitor the first filtered sensor output to detect a contact event.

8. The system of claim 1 where the first sensor comprises a vibration sensor configured to sense a vibration in the medium.

9. The system of claim 1 further comprising a second sensor comprising a vibration sensor configured to sense a vibration in the medium, wherein the first sensor comprises a vibration sensor attached to the first object configured to sense vibrations in solid materials.

10. The system of claim 9, wherein the signal processor is further configured to implement a second bandpass filter to produce a second filtered sensor output by filtering the output of the second sensor to remove all data from the output of the first sensor except that which falls within the second frequency range.

* * * * *